(12) United States Patent
Schlenker

(10) Patent No.: US 11,085,482 B2
(45) Date of Patent: Aug. 10, 2021

(54) NUT HOLDER ASSEMBLY AND METHOD FOR MOUNTING ATTACHMENTS TO A SLOTTED MEMBER

(71) Applicant: Robb Schlenker, Auburn Hills, MI (US)

(72) Inventor: Robb Schlenker, Auburn Hills, MI (US)

(73) Assignee: Knight Industries, Auburn Hills, MI (US)

( * ) Notice: Subject to any disclaimer, the term of this patent is extended or adjusted under 35 U.S.C. 154(b) by 329 days.

(21) Appl. No.: 16/407,370

(22) Filed: May 9, 2019

(65) Prior Publication Data

US 2020/0355214 A1 Nov. 12, 2020

(51) Int. Cl.
*F16B 37/04* (2006.01)
*F16B 5/02* (2006.01)

(52) U.S. Cl.
CPC .......... *F16B 37/045* (2013.01); *F16B 37/044* (2013.01); *F16B 5/02* (2013.01); *F16B 37/04* (2013.01)

(58) Field of Classification Search
CPC .......... F16B 5/02; F16B 5/0208; F16B 37/04; F16B 37/044; F16B 37/045; F16B 41/002
USPC ........ 411/103, 108, 111, 112, 431–432, 520, 411/522–523
See application file for complete search history.

(56) References Cited

U.S. PATENT DOCUMENTS

| | | | | |
|---|---|---|---|---|
| 2,394,729 A | * | 2/1946 | Tinnerman | F16B 37/044 411/112 |
| 3,319,691 A | * | 5/1967 | Fisher | F16B 27/00 411/96 |
| 4,778,321 A | * | 10/1988 | Okawa | F16B 43/00 411/523 |
| 4,895,484 A | * | 1/1990 | Wilcox | F16B 37/044 411/103 |
| 4,948,313 A | * | 8/1990 | Zankovich | E04B 1/4107 411/103 |
| 6,270,281 B1 | * | 8/2001 | Ruusuvuori | H05K 7/1425 211/182 |
| 6,443,677 B1 | * | 9/2002 | Patterson, Jr. | F16B 37/041 411/112 |
| 7,658,579 B1 | * | 2/2010 | Stewart | F16B 37/065 411/112 |
| 8,206,070 B2 | * | 6/2012 | Walker | F16B 37/061 411/119 |
| 8,469,413 B2 | * | 6/2013 | Novajovsky | E05B 15/0245 292/341.19 |
| 9,490,743 B2 | * | 11/2016 | Reynolds | H02S 40/34 |
| 2007/0243039 A1 | * | 10/2007 | Johnson | F16B 37/044 411/111 |

* cited by examiner

*Primary Examiner* — Roberta S Delisle
(74) *Attorney, Agent, or Firm* — John R. Benefiel

(57) ABSTRACT

A nut holder assembly for use in bolting an attachment to a slotted supporting member by bolts received in a one of a respective nuts included in the nut holder assembly.

12 Claims, 3 Drawing Sheets

NUT HOLDER ASSEMBLY AND METHOD FOR MOUNTING ATTACHMENTS TO A SLOTTED MEMBER

CROSS REFERENCE TO RELATED APPLICATIONS

This application claims the benefit of U.S. provisional application No. 62/814,333 filed on Mar. 6, 2019.

BACKGROUND OF THE INVENTION

This invention concerns a nut holder method for mounting attachments to a slotted member by means of a connection using bolts aligned with the slot and received in threaded holes in a component contained within a space defined in the member into which the slot extends.

It is often necessary to mount attachments to a slotted member such as a track of an overhead conveyor, a tooling fixture, etc., using bolts threaded into threaded holes in a component positioned within an internal space defined within the member into which the slot extends, the threaded holes held in alignment with the slot. The components is typically a plate having two or more spaced apart threaded holes which plate is manually held in a positioned to receive the bolts after being passed through holes in the attachment. Typically, the plate is turned sideways to be able to be inserted through the slot and into the internal space defined within the member and a bolt is then inserted into each hole in the attachment and passed through the slot and then threaded into a respective threaded hole in the plate manually held in position. The plate is wider than the slot so as to clamp the attachment to the member when the bolts are tightened.

While a plate formed with threaded holes is seemingly a simple part, it is relatively expensive to make such plates in the number of sizes required and it is also relatively awkward to hold the plate in position within the space next to the slot while the bolts are threaded into the threaded holes plate.

It is an object of the present invention to provide a component which may be positioned to be aligned with a slot in a member without having to manually hold the component, the component also having threaded holes receiving the bolts.

It is a further object to provide such a component which can be made at a lower cost than plates with threaded holes machined therein.

SUMMARY OF THE INVENTION

The above recited objects are achieved by a component comprising a nut holder assembly which is formed by cutting a pattern of openings in a strip of bendable sheet material, preferably by laser cutting sheet material to form the strip, also including cutting out hex openings spaced apart along the length of the strip. Each hex opening receives a nut to be held on to the holder strip to thereby prevent rotation of the nut thereof when a respective bolt is attempted to be threaded into one of the nuts. The nuts preferably are of a commercially available type which have a flange on one end and a locking ring installed in the thread at the other end to prevent loosening when in service.

The flange on each nut engages areas of the strip adjacent the respective hex opening to prevent the nuts from passing completely through the respective hex hole in which a respective nut is received.

End sections of the strip and a location next to a respective end are slotted at a location between each of the end sections and one end of an intermediate section lying between the end sections which enables manual folding each end section back over the intermediate section so as to align an oversized hole formed in each end section with an adjacent nut held in the hex on an opposite end side of the nut from the flange thereby capturing the nuts in the formed strip. This also aligns each bolt to pass through a respective hole to be received and threaded into a respective nut positioned in alignment with behind the opening.

A tab projecting down from the end of each of the end sections can then be folded over to form a flat bottom on the nut holder, enabling it to rest on a bottom surface of the inner space of the slotted member with the nuts and holes aligned to be able to receive the bolts threaded into a respective nut which are then tightened to draw the attachment tight against the member.

DESCRIPTION OF THE DRAWING FIGURES

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
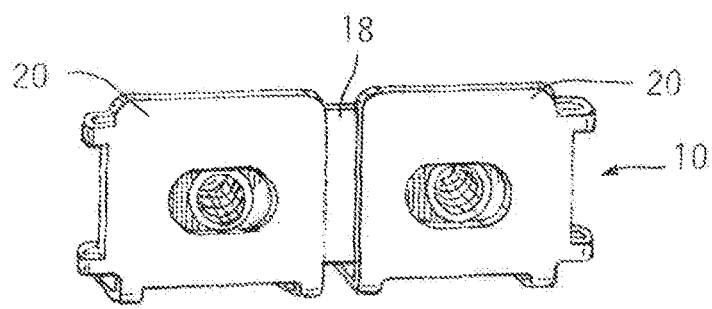
FIG. 1 is a perspective view from the front of a nut holder assembly according to the present invention.
Figure 2:
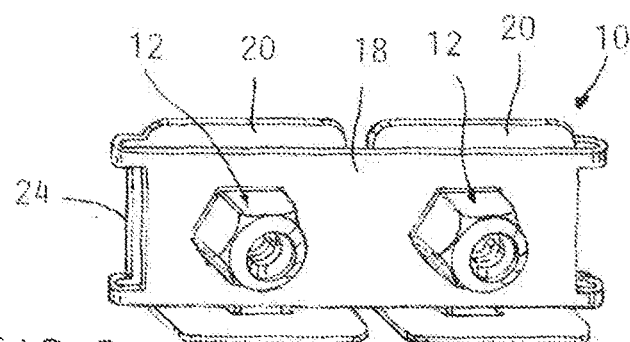
FIG. 2 is a perspective view from the rear of the nut holder assembly shown in FIG. 1.

Referring to the drawings and in particular FIGS. 1 and 2, a nut holder assembly 10 according to the present invention is shown which supports two nuts 12 in the embodiment shown, although a different number of nuts 12 can be held in a nut holder assembly as described below.

The nut holder assembly 10 is formed from a strip 14 (FIG. 3) of a bendable sheet material, such as steel or aluminum on the order of 1/32 inch thickness, to facilitate manual forming of bends therein as described below.

The strip 14 may advantageously be laser cut from a larger sheet of material with various openings cut out.

Figure 3:
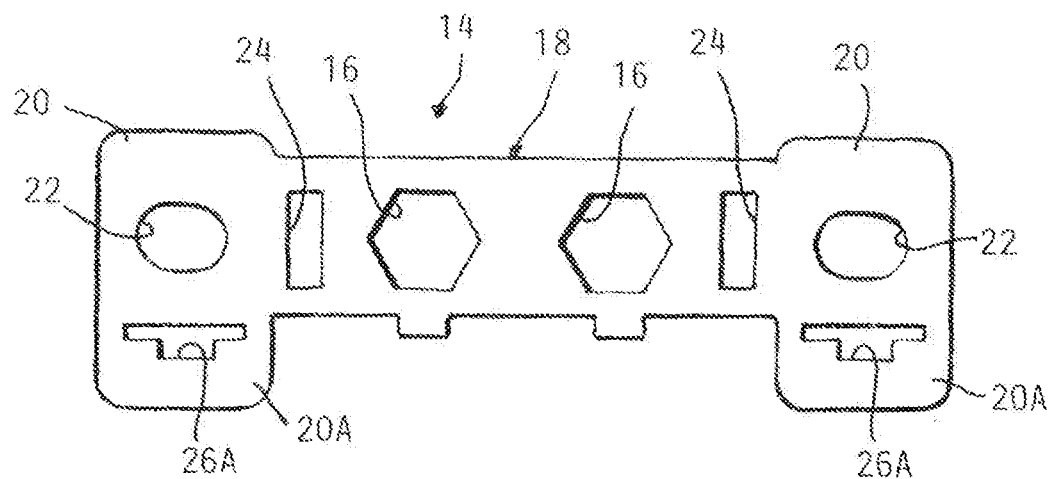
FIG. 3 is a plan view of a strip made from sheet material having cut outs to enable forming the nut holder shown in FIGS. 1 and 2.
Figure 9:
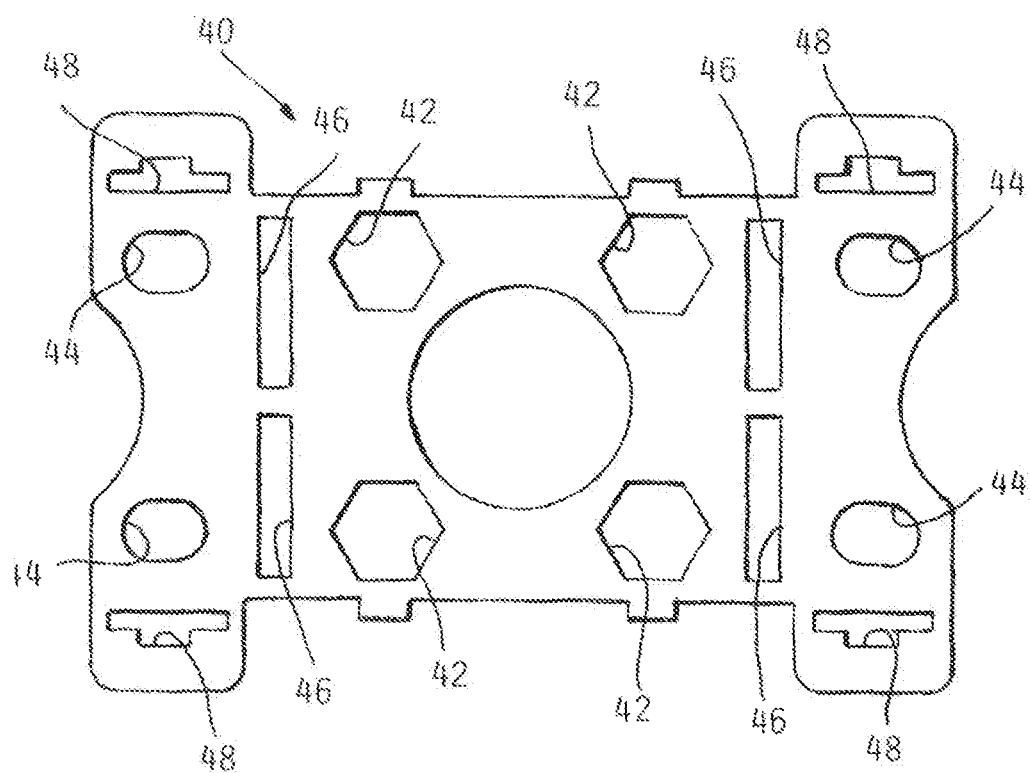
FIG. 9 is a plan view of a strip of a nut holder assembly configuration allowing four nuts to be installed in a nut holder.

In the embodiment of FIG. 3, these openings include a pair of hex openings 16 spaced apart and centered along the length of an intermediate section 18 of the strip 14.

Two end sections 20 are cut out are at each end with the intermediate section 18.

Each end section 20 have an elongated hole 22 cut therein in the middle of the strip. A transversely extending slot 24 is cut out between each end of the intermediate section 18 and an inner side of each end section 20 to enable manually bending of each end section 20 so to extend over each end of the intermediate section 18 so as to position each hole 22 over a respective of the hex openings (FIG. 4).

Figure 4:
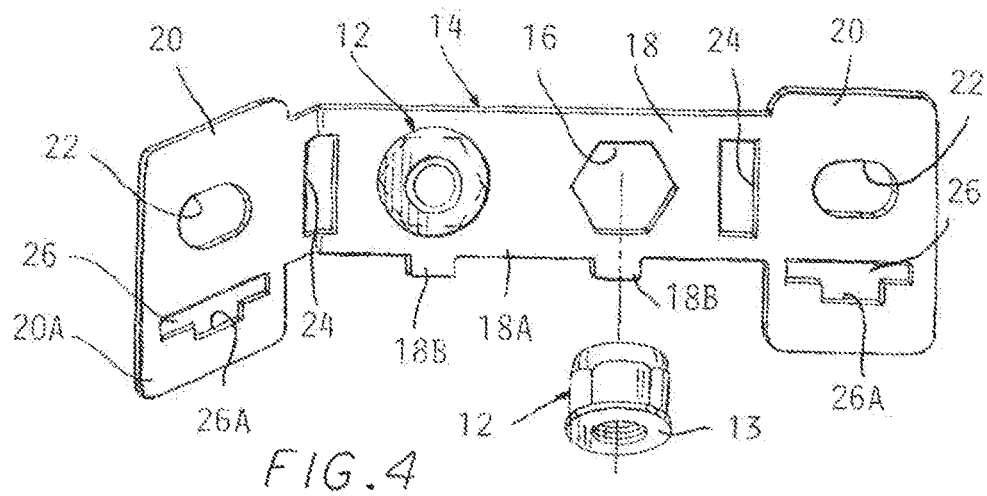
FIG. 4 is a perspective view from the rear of a partially formed strip and partially exploded nuts assembled to the strip when fully formed.
Figure 5:
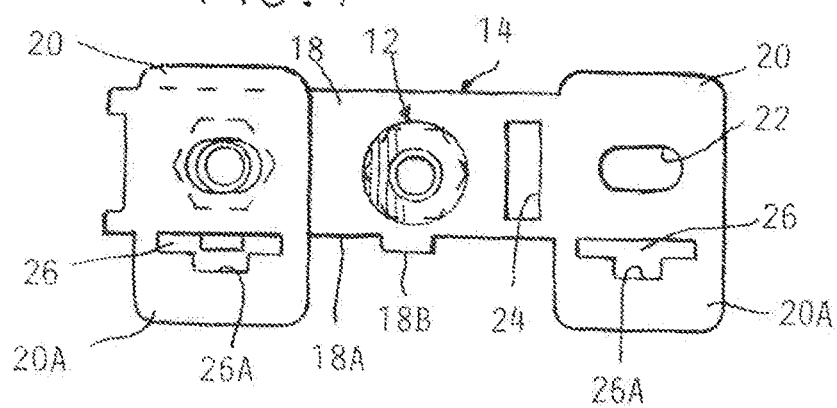
FIG. 5 is a rear view of a partially formed strip with two nuts inserted in a respective hex hole in the strip.

A nut 12 is inserted into each respective hex opening 16, with a flange 13 formed at one end thereof overlying the surface of the intermediate section 18 towards which the end sections 20 extend when the end sections 20 are folded over a respective end of the intermediate section, to capture the nuts 12 and incorporate the same in the nut holder assembly 10 in FIG. 4.

Each end section 20 is thereby located under a respective end of the intermediate section 18. Each end section is formed with a downward projection portion 20A lying below a bottom edge 18A of the intermediate section 18.

A slot 26 extending parallel to the bottom edge 18A of the intermediate section 18 is cut into each end section 20 at the level of the intermediate section bottom edge 18A.

Figure 6:
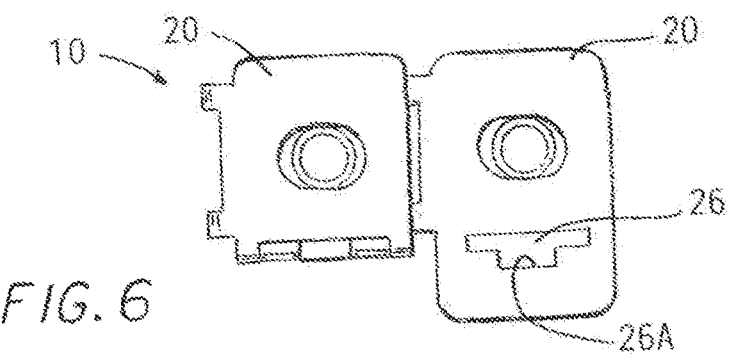
FIG. 6 is a front view of the partially formed strip shown in FIG. 5 with the two nuts assembled thereto.

This allows each lower projection 20A to be folded up (FIG. 6) along a line which is at the level of the bottom edge of the intermediate section 18.

A central notch 26A is formed at the center of each slot 26 so as to receive a tab 18B which positively locates each end section 20 in its folded over condition.

Figure 7:
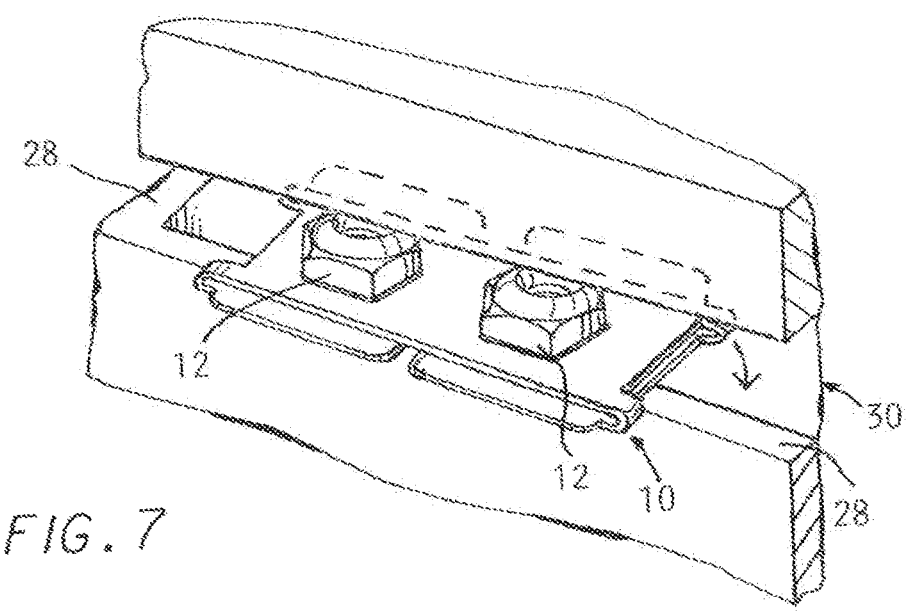
FIG. 7 is a perspective view of a completed nut holder assembly turned sideways and inserted into a slot in a track member.
Figure 8:
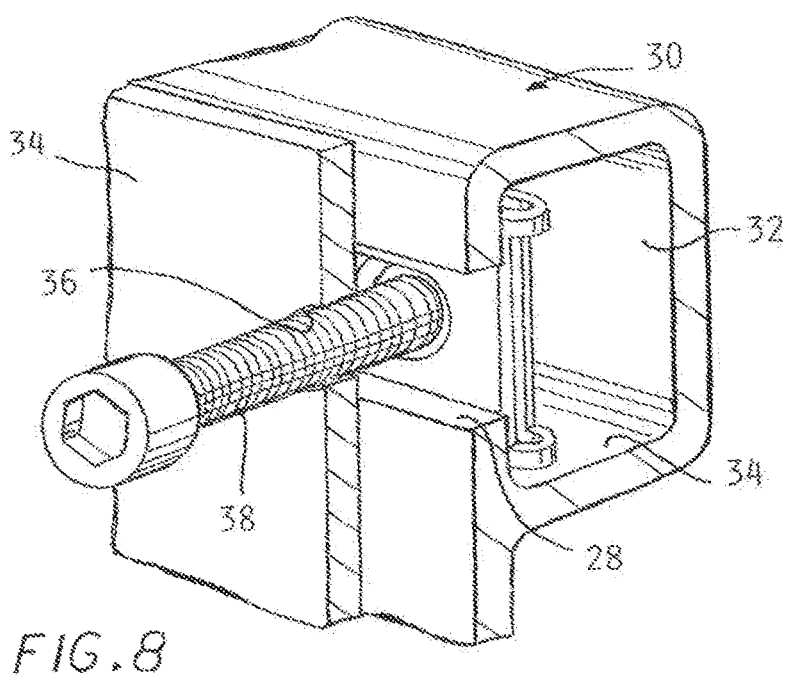
FIG. 8 is a fragmentary perspective view of a track member with the nut holder assembly shown in FIG. 5 installed therein and a bolt being threaded into a nut of the nut holder assembly, the bolt passing through a hole in a attachment being thereby inserted to the track member.

Referring to FIG. 7, the nut holder assembly 10 is turned on edge to be able to be inserted into a slot 28 in a track member 30 and then tipped down so that the bent over tabs 20A are brought to rest on the bottom 32 of an enlarged space 32 defined within the member 30 (FIG. 8).

The nut holder assembly 10 is dimensioned relative the track member 30 so as to align the nuts 12 with the slot 28 when resting on the bottom of the space 32.

An attachment 34 has holes 36 formed therein receiving mounting bolts 38 able to be threaded into the aligned nuts 12.

The bolts 38 are then advanced to tightly hold the attachment 34 against the track member 30.

FIG. 8 shows a double version of the strip 40, having two sets of hex openings 42, holes 44, and slots 46, 48.

The invention claimed is:

1. A nut holder assembly for mounting an attachment to a supporting member having a slot formed therein extending into an enlarged space located behind said slot, said nut holder assembly comprising a strip of a bendable sheet material having a pair of end sections and an intermediate section extending between said end sections, each of said end sections formed with a hole allowing a mounting bolt to pass through;

said intermediate section having two hex openings with a nut received in each hex opening;

said end sections each folded over an adjacent end portion of said intermediate section so as to align each nut with a respective end section hole to allow a mounting bolt inserted into each hole to be threaded into an aligned respective nut in a respective hex opening to mount said attachment to said supporting member.

2. The nut holder assembly according to claim 1 wherein a pair of slots are formed in said strip between each of said end sections and a respective end of said intermediate section to facilitate bending over each end section to locate each of said holes over a respective nut threaded hole.

3. The nut holder assembly according to claim 1 wherein each of said end section holes are elongated to accommodate any limited misalignment of one or both of said end section holes with a respective nut.

4. The nut holder assembly according to claim 1 wherein each of said end sections has a projection on a bottom side thereof which is folded upwardly towards a respective hole to form a horizontal rest allowing said nut holder assembly to rest on a horizontal bottom defined of said enlarged space of said supporting member.

5. The nut holder assembly according to claim 4 wherein a tab slot is formed between each of said projections and an associated main part of said end section to facilitate said folding up of said projection.

6. The nut assembly holder of claim 5 wherein each tab slot has an enlarged notch intermediate the length of said tab slot configured to receive a respective tab projecting from said intermediate section.

7. The nut holder assembly according to claim 1 wherein each of said nuts is formed with a flange on one end engaging a perimeter of said strip extending around each hex opening limiting travel each of said nuts into said hex opening so that said nuts are captured between a respective folded over end section and a respective end of said intermediate section.

8. A method of forming a nut holder assembly comprising:

a forming pair of hex openings along an intermediate section of a strip of sheet material able to have bends formed therein;

forming a hole in each of a pair of end sections of said strip each end section adjacent respective ends of said intermediate section;

installing a nut in each hex opening;

folding each of said end sections over respective adjacent ends of said intermediate section so as to bring each hole over a respective nut held in a hex opening in said intermediate section.

9. The method according to claim 8 wherein said holes are elongated to accommodate misalignment between said holes and said nuts.

10. The method according to claim 8 further including forming a slot between each end section and an adjacent end of said intermediate section to facilitate bending said end sections over a respective end of said intermediate section so as to position each hole in a respective end section over a respective hex opening.

11. The method according to claim 8 further including forming each end section with a downward extending protrusion and folding each protrusion up to extend horizontally to provide support of said nut holder assembly on a horizontal surface of a supporting member on which said nut holder assembly is to be installed.

12. A method of mounting an attachment to a supporting member formed with a lengthwise extending slot extending apart into an enlarged inner space defined within said supporting member comprising:

forming a plurality of space hex shaped holes along an intermediate section of a strip of sheet material which can have bends formed therein;

forming a hole in each of a pair of end sections adjacent respective opposite ends of said intermediate section;

installing a nut in each hex opening and folding said end sections over said respective opposite ends of said intermediate section so as to bring each end section hole over a respective nut held in a respective hex shaped opening formed in said intermediate section.

\* \* \* \* \*